(12) United States Patent
Fukuyama

(10) Patent No.: US 11,038,408 B2
(45) Date of Patent: Jun. 15, 2021

(54) METHOD FOR MANUFACTURING MAGNET EMBEDDED CORE

(71) Applicant: Kuroda Precision Industries Ltd., Kanagawa (JP)

(72) Inventor: Osamu Fukuyama, Kanagawa (JP)

(73) Assignee: Kuroda Precision Industries Ltd., Kanagawa (JP)

( * ) Notice: Subject to any disclaimer, the term of this patent is extended or adjusted under 35 U.S.C. 154(b) by 195 days.

(21) Appl. No.: 16/073,845

(22) PCT Filed: Mar. 24, 2017

(86) PCT No.: PCT/JP2017/012034
§ 371 (c)(1),
(2) Date: Jul. 30, 2018

(87) PCT Pub. No.: WO2017/179398
PCT Pub. Date: Oct. 19, 2017

(65) Prior Publication Data
US 2019/0044423 A1    Feb. 7, 2019

(30) Foreign Application Priority Data

Apr. 13, 2016  (WO) .................. PCT/JP2016/002009
Sep. 9, 2016   (WO) .................. PCT/JP2016/004123
Oct. 31, 2016  (WO) .................. PCT/JP2016/082291

(51) Int. Cl.
*B29C 43/18*     (2006.01)
*H02K 15/12*     (2006.01)
(Continued)

(52) U.S. Cl.
CPC .......... *H02K 15/125* (2013.01); *B29C 43/18* (2013.01); *B29C 45/03* (2013.01);
(Continued)

(58) Field of Classification Search
None
See application file for complete search history.

(56) References Cited

U.S. PATENT DOCUMENTS 3,488,410 A  1/1970  Downes
3,568,554 A  3/1971  Wiechee
(Continued)

FOREIGN PATENT DOCUMENTS

CN  101356711 A  1/2009
CN  102843000 A  12/2012
(Continued)

OTHER PUBLICATIONS

English translation of JP2006311782 provided by google patent. (Year: 2006).*
(Continued)

*Primary Examiner* — Edmund H Lee
(74) *Attorney, Agent, or Firm* — Dority & Manning, P.A.

(57) ABSTRACT

To prevent the creation of unnecessary resin from the resin used for fixing the magnet, a device for manufacturing a magnet embedded core including a magnet embedded in resin filling a magnet insertion hole (104) extending axially in a motor core comprises a resin charging device (80) configured to charge the resin (114) in solid form into the magnet insertion hole (104), a magnet insertion device (90) configured to insert the magnet (110) into the magnet insertion hole (104), and a heating device (70) configured to heat the motor core (101) to melt the resin (114) in solid form received in the magnet insertion hole (104).

8 Claims, 13 Drawing Sheets

(51) Int. Cl.

| | | |
|---|---|---|
| *H02K 15/03* | (2006.01) | |
| *H02K 1/27* | (2006.01) | |
| *H02K 1/28* | (2006.01) | |
| *H02K 11/20* | (2016.01) | |
| *H02K 11/21* | (2016.01) | |
| *H02K 11/30* | (2016.01) | |
| *B29C 45/03* | (2006.01) | |
| *B29C 45/14* | (2006.01) | |
| *B29C 45/76* | (2006.01) | |
| *B29C 45/80* | (2006.01) | |
| *F16H 25/20* | (2006.01) | |
| *H02K 7/06* | (2006.01) | |
| *B29K 101/10* | (2006.01) | |
| *B29K 105/00* | (2006.01) | |
| *B29L 31/00* | (2006.01) | |

(52) U.S. Cl.
CPC .... *B29C 45/14467* (2013.01); *B29C 45/7653* (2013.01); *B29C 45/80* (2013.01); *F16H 25/20* (2013.01); *H02K 1/276* (2013.01); *H02K 1/28* (2013.01); *H02K 7/06* (2013.01); *H02K 11/20* (2016.01); *H02K 11/21* (2016.01); *H02K 11/30* (2016.01); *H02K 15/03* (2013.01); *H02K 15/12* (2013.01); *B29C 2043/182* (2013.01); *B29C 2945/76006* (2013.01); *B29C 2945/76083* (2013.01); *B29C 2945/76568* (2013.01); *B29K 2101/10* (2013.01); *B29K 2105/251* (2013.01); *B29K 2995/0008* (2013.01); *B29L 2031/7498* (2013.01); *F16H 2025/2053* (2013.01)

(56) References Cited

U.S. PATENT DOCUMENTS

| | | | |
|---|---|---|---|
| 4,923,383 A | 5/1990 | Kurumaji | |
| 4,981,635 A * | 1/1991 | Yamashita | B22F 1/0059 |
| | | | 252/62.54 |
| 5,149,477 A * | 9/1992 | Yamashita | C08L 63/00 |
| | | | 148/101 |
| 5,288,447 A * | 2/1994 | Day | B29C 43/18 |
| | | | 264/112 |
| 7,897,089 B2 * | 3/2011 | Matsubayashi | B29C 45/021 |
| | | | 264/279 |
| 8,896,177 B2 | 11/2014 | Kim | |
| 8,991,035 B2 | 3/2015 | Sasaki et al. | |
| 2009/0085416 A1 | 4/2009 | Masuzawa et al. | |
| 2009/0189309 A1 | 7/2009 | Matsubayashi | |
| 2010/0083486 A1 | 4/2010 | Amano et al. | |
| 2013/0069747 A1 | 3/2013 | Honkura et al. | |
| 2014/0042856 A1 | 2/2014 | Miyashita et al. | |
| 2014/0124978 A1 | 5/2014 | Mabu | |
| 2014/0131919 A1 | 5/2014 | Mahn | |
| 2014/0196276 A1 | 7/2014 | Nagai et al. | |
| 2014/0327329 A1 | 11/2014 | Kitada | |
| 2015/0054196 A1 | 2/2015 | Ishimatsu et al. | |
| 2017/0170696 A1 * | 6/2017 | Ogawa | H02K 1/2773 |

FOREIGN PATENT DOCUMENTS

| | | | |
|---|---|---|---|
| DE | 102011078419 | | 6/2012 |
| DE | 102011119512 | | 5/2013 |
| JP | 2001169485 | | 6/2001 |
| JP | 2001352747 | | 12/2001 |
| JP | 2002272033 | * | 9/2002 |
| JP | 2005185081 | | 7/2005 |
| JP | 2006211748 A | | 8/2006 |
| JP | 2006311782 | * | 11/2006 |
| JP | 2007110880 A | | 4/2007 |
| JP | 2009100634 | | 5/2009 |
| JP | 2009171785 | | 7/2009 |
| JP | 2010213536 A | | 9/2010 |
| JP | 2012010595 | | 1/2012 |
| JP | 2012223024 A | | 11/2012 |
| JP | 201407926 | * | 1/2014 |
| JP | 2014007926 | | 1/2014 |
| JP | 2014018074 | | 1/2014 |
| JP | 2014079056 | | 5/2014 |
| JP | 2014083811 A | | 5/2014 |
| JP | 2014093917 | * | 5/2014 |
| JP | 2014093917 A | | 5/2014 |
| JP | 2014138448 | | 7/2014 |
| JP | 2014143919 | | 8/2014 |
| JP | 2015039296 | | 2/2015 |
| JP | 2015089169 | | 5/2015 |

OTHER PUBLICATIONS

European Search Report for EP16898547.1 dated Nov. 11, 2019, 12 pages.
European Search Report for EP16898548.9 dated Nov. 11, 2019, 17 pages.
International Search Report for PCT/JP2016/002009 dated Jul. 7, 2016.
International Search Report for PCT/JP2017/014700 dated Jun. 29, 2017.
International Search Report for PCT/JP2016/004123 dated Nov. 24, 2016, 2 pages.
International Search Report for PCT/JP2016/082291 dated Jan. 18, 2017, 1 page.
International Search Report for PCT/JP2017/012034 dated Jun. 12, 2017, 2 pages.
Japanese Office Action for JP2017528861 dated Jan. 16, 2018, 4 pages.
Japanese Office Action for JP2017200993 dated Feb. 13, 2018, 4 pages.

* cited by examiner

METHOD FOR MANUFACTURING MAGNET EMBEDDED CORE

CROSS REFERENCE TO RELATED APPLICATIONS

This application is the U.S. National Stage entry of International Application Number PCT/JP2017/012034 filed under the Patent Cooperation Treaty having a filing date of Mar. 24, 2017, which claims priority to international Application Number PCT/JP2016/002009 having a filing date of Apr. 13, 2016, international Application Number PCT/JP2016/004123 having a filing date of Sep. 9, 2016, and international Application Number PCT/JP2016/082291 having a filing date of Oct. 31, 2016, which are incorporated herein by reference.

TECHNICAL FIELD

The present invention relates to a method and a device for manufacturing a magnet embedded core having magnets embedded therein.

BACKGROUND ART

Conventionally, it is known to manufacture a magnet embedded core by inserting a magnet into each of a plurality of magnet insertion holes extending axially in a rotor core, charging resin material in liquid form into the magnet insertion holes, and curing the charged resin material to fix the magnets in the rotor core. By fixing the magnets in the respective magnet insertion holes with the resin, the magnetic property of the rotor core can be stabilized, and the rotor core is enabled to follow the rotating magnetic field created by the stator in a stable manner.

In conjunction with such a method for manufacturing a magnet embedded core, it is known, for example, to place a rotor core, along with an intermediate die, in a mold die assembly having an upper die and a lower die, the lower die being provided with a tubular pot and a plunger vertically movable in the pot, and pressure-feed mold resin melted in the pot by moving the plunger upward such that the mold resin is charged into the magnet insertion holes of the rotor core via runners and gates formed between the intermediate die and the lower die, and is thereafter thermally cured. See Patent Document 1, for instance.

PRIOR ART DOCUMENT(S)

Patent Document(s)

Patent Document 1: JP2014-79056A

SUMMARY OF THE INVENTION

Task to be Accomplished by the Invention

According to the prior art such as that disclosed in Patent Document 1, when the mold die assembly is opened and the molded rotor core is removed after the resin molding, cured resin inevitably remains in the runners or the likes, and this remaining resin (unnecessary resin) is eventually separated from the rotor core and discarded. Therefore, in view of minimizing the material cost of the resin material or from other points of view, it is desirable to prevent such unnecessary resin from being created.

The present invention was made in view of such a problem of the prior art, and has a primary object to prevent creation of such unnecessary resin from the resin material used for fixing magnets.

Means to Accomplish the Task

One embodiment of the present invention provides a device for manufacturing a magnet embedded core including a magnet embedded in resin filling a magnet insertion hole extending axially in a motor core, the device comprising: a resin charging device configured to charge the resin in solid form into the magnet insertion hole; a magnet insertion device configured to insert the magnet into the magnet insertion hole; and a heating device configured to heat the motor core to melt the resin in solid form in the magnet insertion hole.

Owing to this arrangement, since the solid resin is charged into the magnet insertion hole, and melts in the magnet insertion hole, as opposed to the case of injection molding in which the molten resin is filled into the magnet insertion hole under pressure via runners and gates provided in the die assembly, the resin material is prevented from remaining in places such as runners and gates. Thereby, the creation of unnecessary resin in the step of fixing the magnet in the magnet insertion hole can be avoided.

Preferably, the device for manufacturing a magnet embedded core further comprises a pressurization device configured to pressurize the molten resin in the magnet insertion hole.

Owing to this arrangement, the voids that may remain in the molten resin are expelled or contracted so that the magnet can be fixed by the resin relatively free of voids in a reliable manner.

Preferably, the manufacturing device further comprises an upper die and a lower die configured to clamp the motor core between the upper die and the lower die.

Thus, the motor core can be clamped between the upper die and the lower die.

Preferably, the manufacturing device further comprises a pressurization device configured to pressurize the molten resin in the magnet insertion hole via the upper die and die lower die.

Thus, the molten resin in the magnet insertion hole is pressurized while the motor core is clamped between the upper die and the lower die, the pressurization step can be performed in a reliable manner, and the magnet can be fixed by the resin relatively free of voids in an even more reliable manner.

In this manufacturing device, preferably, the resin charging device is configured to charge the resin into the magnet insertion hole in the motor core placed on the lower die.

Thus, no extra position is required to be set aside for charging the resin.

In this manufacturing device, preferably, the resin charging device is configured to charge the resin into the magnet insertion hole in the motor core outside the upper die and the lower die.

Thereby, the use efficiency of the upper die and the lower die can be improved, and the manufacturing cost may be reduced.

In this manufacturing device, preferably, the magnet insertion device is configured to insert the magnet into the magnet insertion hole in the motor core placed on the lower die.

Thus, no extra position is required to be set aside for inserting the magnet.

In this manufacturing device, preferably, the magnet insertion device is configured to insert the magnet into the magnet insertion hole in the motor core outside the upper die and the lower die.

Thereby, the use efficiency of the upper die and the lower die can be improved, and the manufacturing cost may be reduced.

Preferably, this manufacturing device further comprises a heating oven configured to heat the motor core outside the upper die and the lower die.

Thereby, the use efficiency of the upper die and the lower die can be improved, and the manufacturing cost may be reduced.

Another aspect of the present invention provides a method for manufacturing a magnet embedded core including a magnet embedded in resin filling a magnet insertion hole extending axially in a motor core, the method comprising: a resin charging step of charging the resin in solid form into the magnet insertion hole; a magnet insertion step of inserting the magnet before or after the resin charging step; a melting step of melting the resin in the magnet insertion hole; and a curing step of curing the molten resin.

Owing to this arrangement, since the solid resin is charged into the magnet insertion hole, and melts in the magnet insertion hole, as opposed to the case of injection molding in which the molten resin is filled into the magnet insertion hole under pressure via runners and gates provided in the die assembly, the resin material is prevented from remaining in places such as runners and gates. Thereby, the creation of unnecessary resin in the step of fixing the magnet in the magnet insertion hole can be avoided.

Preferably, the manufacturing method further comprises a resin pressurization step of pressurizing the molten resin.

According to this method, the voids that may remain in the molten resin are expelled or contracted so that the magnet can be fixed by the resin relatively free of voids in a reliable manner.

In this manufacturing method, preferably, the melting step comprises at least partly melting the solid resin by the motor core which is preheated prior to the resin charging step.

Thereby, the time period required for the motor core to reach a temperature required for melting the solid thermosetting resin in the melting step can be reduced so that the manufacturing efficiency can be improved.

In this manufacturing method, preferably, the solid resin is formed by molding uncured raw material resin in powder or granular form into a prescribed shape. The solid resin molded into the prescribed shape may include the solid resin molded to conform to the shape of the magnet insertion hole.

Thereby, the amount of the solid resin that is to be charged into the magnet insertion hole can be set to a correct amount beforehand. Also, the handling of the solid resin can be improved, and the work efficiency in the resin charging step can be improved.

In this manufacturing method, preferably, at least one of outer surfaces of the solid resin is in contact with an inner surface of the motor core defining the magnet insertion hole.

Thereby, the heat transfer from the motor core to the solid resin is performed in an efficient manner so that the time period required for melting the solid resin in the magnet insertion hole can be reduced, and the manufacturing efficiency can be improved.

In this manufacturing method, preferably, the solid resin is in uncured, granular form. The solid resin in uncured, granular form may include tablets.

Thereby, without regard to the shape of the magnet insertion hole and the necessary amount of the resin, the solid resin can be charged into the magnet insertion hole both correctly and easily.

In this manufacturing method, the magnet may be preheated before being inserted into the magnet insertion hole. In this case, the heat of the magnet inserted into the magnet insertion hole effectively contributes to the melting of the solid resin so that the time period required for melting the solid resin in the melting step can be reduced, and the manufacturing efficiency can be improved.

Effects of the Invention

The device and the method for manufacturing a magnet embedded core according to the present invention can prevent the creation of unnecessary resin from the resin used for fixing the magnet.

BRIEF DESCRIPTION OF THE DRAWING(S)

EMBODIMENT(S) FOR CARRYING OUT THE INVENTION

Preferred embodiments of the present invention are described in the following with reference to the appended drawings.

Figure 1:
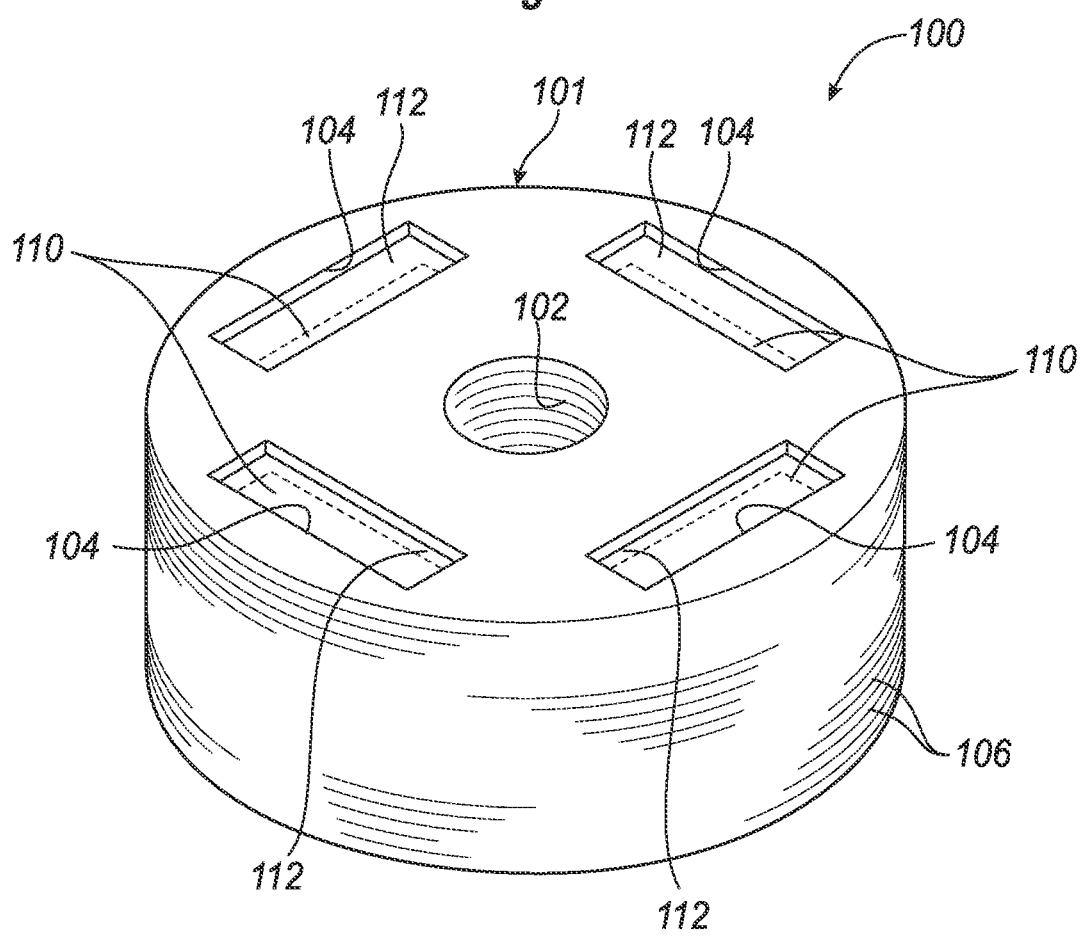
FIG. 1 is a perspective view of an example of a magnet embedded core manufactured b a manufacturing method according to the present invention.
Figure 2:
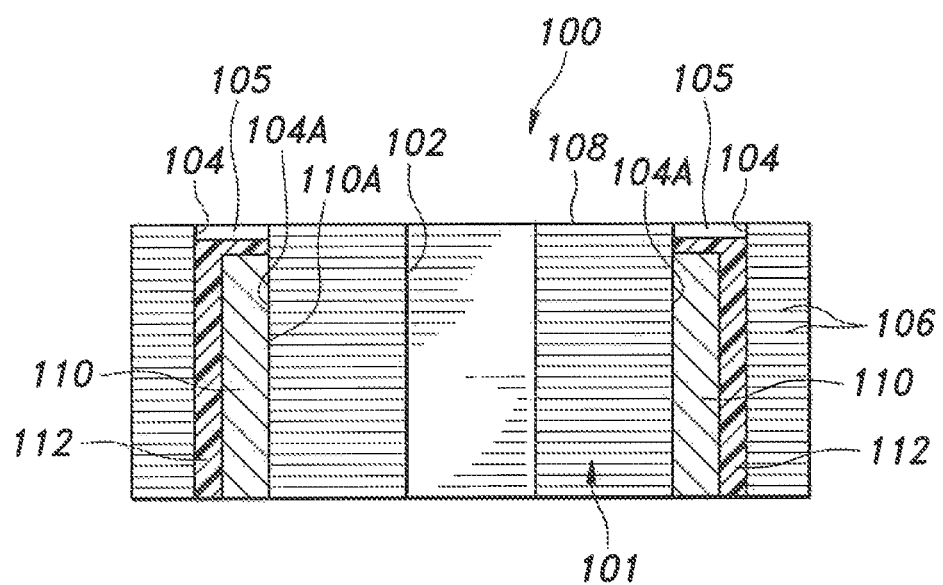
FIG. 2 is a vertical sectional view of the magnet embedded core shown in FIG. 1.

An example of a magnet embedded core manufactured by a manufacturing method according to the present invention is described in the following, with reference to FIGS. 1 and 2.

The magnet embedded core 100 has a motor core 101 including a plurality of magnet insertion holes 104, and magnets 110 positioned in the respective magnet insertion holes 104. The motor core 101 is formed by stacking a plurality of iron core laminates 106 each formed by punching and consisting of a disk formed with openings for defining a center hole 102 and the magnet insertion holes 104.

The magnet insertion holes 104 are arranged around the center hole 102, and are each provided with a substantially rectangular shape in plan view (shape of cross section). Each magnet insertion hole 104 extends axially through the motor core 101 in the stacking direction (axial direction), and defines a substantially rectangular space having an upper opening 105 on an upper end surface 108 of the motor core 101. Each magnet insertion hole 104 is passed axially through the motor core 101 in the illustrated embodiment, but may also be provided with a closed bottom by omitting the opening for defining the magnet insertion hole 104 in the lowermost iron core laminate 106.

Each magnet 110 has a substantially rectangular parallelepiped shape, and is fixed in position relative to the motor core 101 by resin 112 filled in the magnet insertion hole 104. The resin 112 may consist of a thermosetting resin such as epoxy resin that can be cured by being heated to a temperature higher than a prescribed curing temperature.

Each magnet 110 may consist of, for example, a ferrite-based sintered magnet or a permanent magnet (with or without magnetization) such as a neodymium magnet. The axial length of each magnet 110 is smaller than the axial length of the magnet insertion hole 104, and the end surface (in this case, the upper surface) of the magnet 110 is covered with the resin 112.

The width (the dimensions in the tangential direction of the motor core 101 and the radial direction of the motor core 101) of each magnet 110 is smaller than the width (the dimensions in the tangential direction of the motor core 101 and the radial direction of the motor core 101) of the magnet insertion hole 104. The magnet 110 is inwardly offset (or offset toward the center of the motor core 101) in the magnet insertion hole 104 so that the inwardly facing surface 110A of the magnet 110 makes a surface contact with (abuts against) the inner surface 104A of the magnet insertion hole 104. In the drawings, for the convenience of description, the clearance between each surface defining the magnet insertion hole 104 (excluding the inner surface 104A) and the corresponding side surface of the magnet 110 (excluding the inwardly facing surface 110A) is shown greater than the practical size, it is to be noted that the magnet 110 may be placed in the magnet insertion hole 104 so as to be offset outwardly.

A manufacturing device for the magnet embedded core of the illustrated embodiment is described in the following with reference to FIGS. 3 to 9.

The manufacturing device of the illustrated embodiment includes a device main body 1. The device main body 1 includes a plurality of tie bars 14, a flat lower fixed platen 10 fixed to the lower ends of the tie bars 14, a flat upper fixed platen 12 fixed to the upper ends of the tie bars 14, and a movable platen 16 engaged by the tie bars 14 slidably in an axial direction (vertical direction) so as to be movable in the vertical direction between the lower fixed platen 10 and the upper fixed platen 12. The lower fixed platen 10, the upper fixed platen 12, and the movable platen 16 squarely oppose one another.

A lower die 18 forming a fixed die is attached to the upper surface 11 of the lower fixed platen 10. An upper die 20 forming a movable die is attached to the lower surface 17 of the movable platen 16.

The lower die 18 consists of a flat plate that has an upper surface 19 supporting a conveying tray 21, the conveying tray 21 being conveyed into and out of this position by a conveying device (not shown in the drawings) such as a robot arm. The conveying tray 21 consists of a flat plate, and a number of such conveying trays 21 are provided for the single device main body 1 so that a motor core 101 is placed (preset) on each conveying tray 21 outside the device main body 1 (another place outside the lower die 18 and the upper die 20). By feeding the conveying trays 21 each carrying a motor core 101 onto a prescribed position on the lower die 18 one after another, the operating efficiency of the device main body 1 including the upper die 20 and the lower die 18 for interposing one motor core 101 at a time can be improved. Each motor core 101 is correctly positioned on the corresponding conveying tray 21 with the aid of a positioning member (not shown in the drawings) provided on the conveying tray 21.

A cylindrical heating device 70 is detachably arranged on the outer periphery of the motor core 101. The heating device 70 may consist of a high-frequency induction heating device or the like. By heating the motor core 101, the resin 114 (see FIG. 5) in a solid state charged into the magnet insertion hole 104 is melted.

Figure 9:
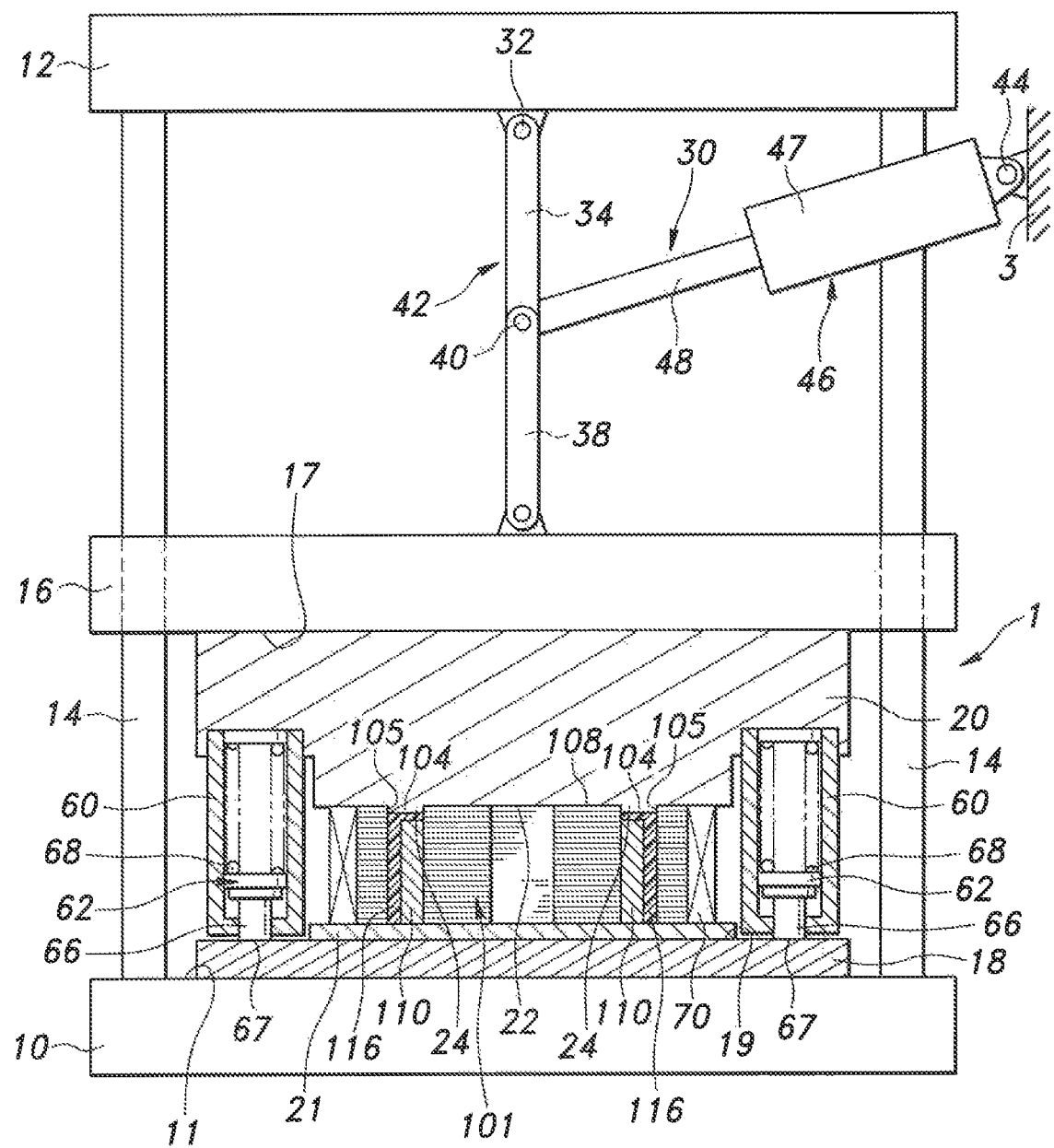
FIG. 9 is a front view of the manufacturing device partly in section in a pressurization step.

The upper die 20 is provided with a substantially flat lower surface 22 which opposes a substantially flat upper end surface 108 of the motor core 101 placed on the lower die 18 so that the motor core 101 can be pressurized in the lamination direction (in the downward direction) by lowering the movable platen 16. The lower surface 22 is provided with pressurization projections 24 in parts thereof aligning with the respective magnet insertion holes 104. Each pressurization projection 24 is provided with a rectangular shape in plan view which is conformal to the shape of the magnet insertion hole 104 in plan view. As shown in FIG. 9, when the movable platen 16 is lowered, the pressurization projections 24 close the upper openings 105 of the magnet insertion holes 104, and pressurize the molten resin 116 in each magnet insertion hole 104. The pressurization projections 24 may also consist of members separate from the upper die 20 and be resiliently supported by springs or the like so as to be vertically movable relative to the upper die 20.

A clamping device (pressurization device) 30 including a toggle link mechanism 42 is provided between the upper fixed platen 12 and the movable platen 16. The toggle link mechanism 42 is configured to drive the movable platen 16 toward and away from the lower fixed platen 10 (in the vertical direction), and includes an upper link 34 having one end pivotally connected to a lower part of the upper fixed platen 12 via a pivot shaft 32, and a lower link 38 having one end pivotally connected to an upper part of the movable platen 16 via a pivot shaft 36. The other ends of the upper link 34 and the lower link 38 are pivotally connected to each other via a pivot shaft 40.

The clamping device 30 includes a hydraulic cylinder device 46. The hydraulic cylinder device 46 is configured to drive the toggle link mechanism 42, and includes a cylinder tube 47 having a base end pivotally connected to a fixed frame 3 of the device main body 1 via a pivot shaft 44 and a piston rod 48 projecting outwardly from a free end of the cylinder tube 47. A tip end of the piston rod 48 is pivotally connected to the other ends of the upper link 34 and the lower link 38 via the pivot shaft 40.

Figure 3:
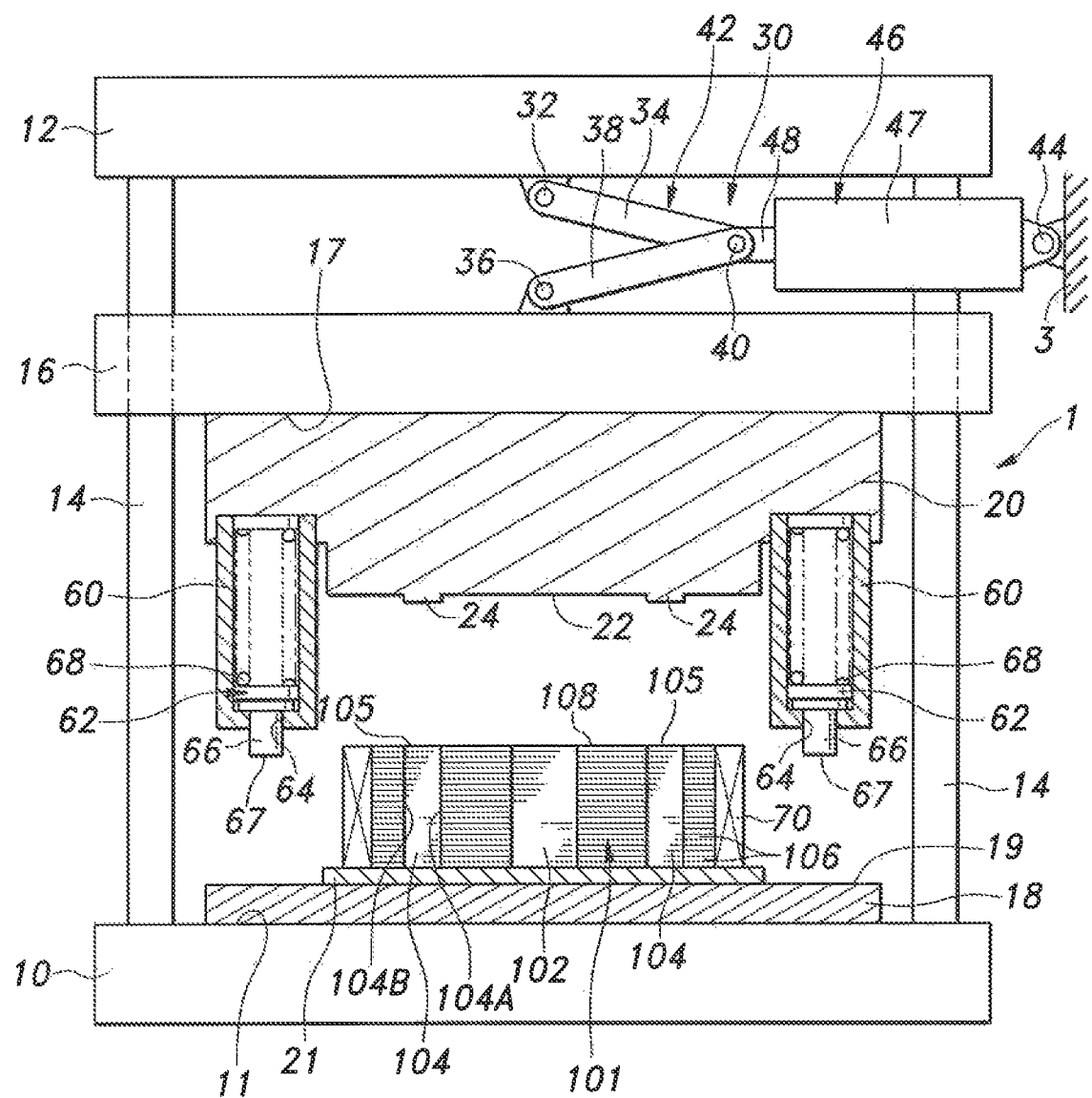
FIG. 3 is a front view of a manufacturing device for the magnet embedded core according to an embodiment of the present invention, partly in section.

The die clamping device 30 causes the movable platen 16 to be positioned at the uppermost position (die open position) when the piston rod 48 has retreated and the toggle link mechanism 42 is in the maximally folded state as shown in FIG. 3, and causes the movable platen 16 to be positioned at the lowermost position (die close position) when the piston rod 48 has advanced and the toggle link mechanism 42 is in the maximally extended state as shown in FIG. 9. In the maximally folded state shown in FIG. 3, the angle formed between the upper link 34 and the lower link 38 is minimized. In the maximally extended state shown in FIG. 9, the upper link 34 and the lower link 38 extend along a vertical straight line (angle formed between the upper link 34 and the lower link 38=180 degrees). The maximally extended state can be detected by measuring the vertical position of the movable platen 16 with a linear sensor (not shown) or any other per se known method.

In the maximally extended state shown in FIG. 9, the upper die 20 is located at the lowermost position together with the movable platen 16, and the lower surface 22 of the upper die 20 is in surface contact with the upper end surface 108 of the motor core 101 placed on the lower die 18 so that the motor core 101 is pressurized in the stacking direction, and the pressurization projections 24 engage the respective magnet insertion holes 104 to close the upper openings 105 thereof and pressurize the molten resin 116 in the respective magnet insertion holes 104. This state is referred to as a clamped state (pressurized state).

Upper ends of a plurality of tubular members 60 extending axially toward the lower die 18 and having closed bottom ends are fixed to the upper die 20. The tubular members 60 are arranged around the center of the motor core 101 positioned on the prescribed position of the lower die 18 via the conveying tray 21, and each receive a piston 62 in a vertically slidable manner. Each piston 62 has a tip end portion 66 that projects out of the corresponding tubular member 60 via a through hole 64 formed in the bottom wall (lower end) of the tubular member 60. A tip end surface 67 of each tip end portion 66 squarely opposes the upper surface 19 of the lower die 18.

In each tubular member 60, a compression coil spring 68 is provided between the upper die 20 and the piston 62. Each compression coil spring 68 urges the corresponding piston 62 toward the bottom end of the tubular member 60 or, in other words, toward the side of the lower die 18. The urging threes applied to the pistons 62 by the compression coil springs 68 in the respective tubular members 60 may be equal to one another.

Figure 8:
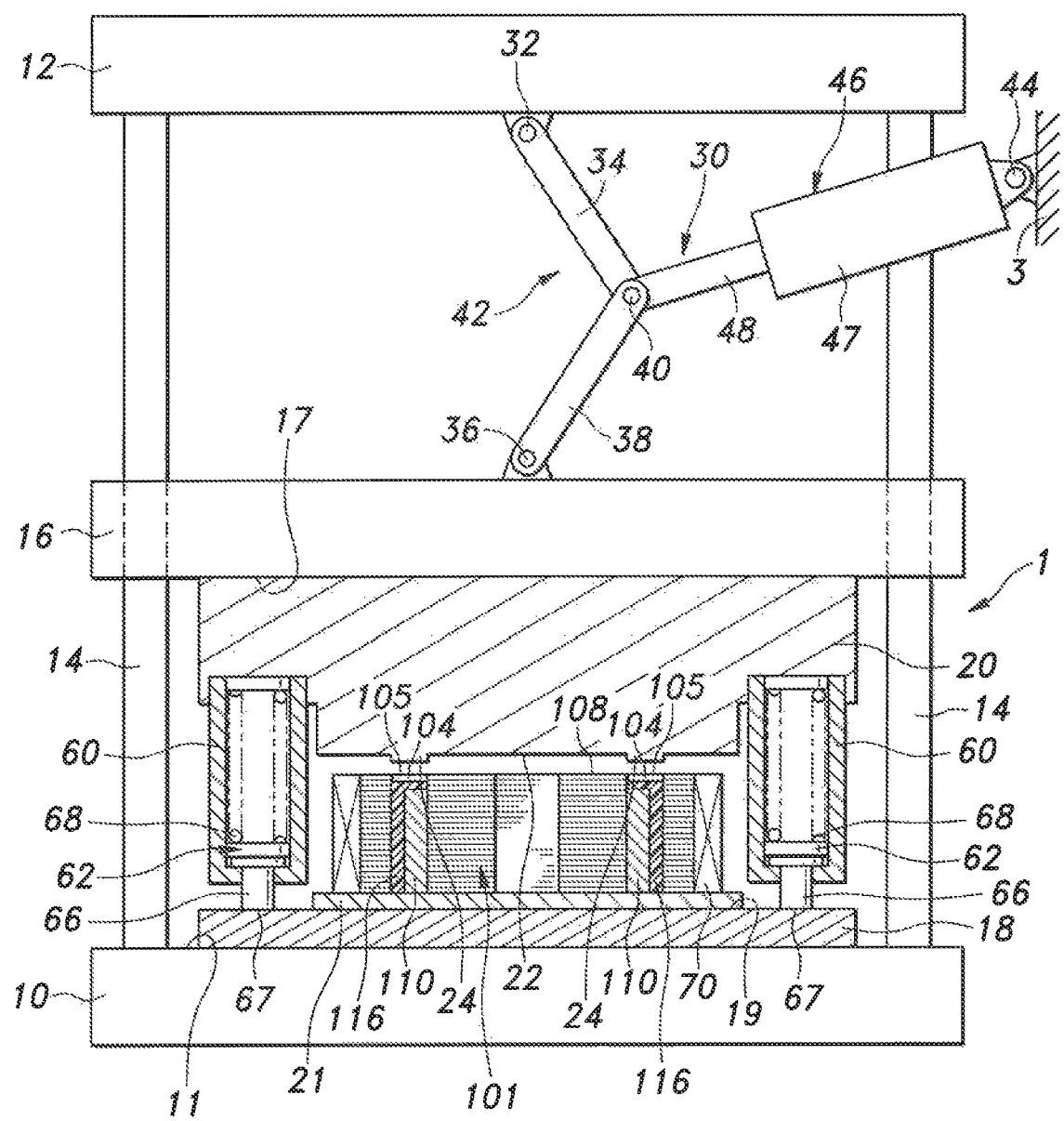
FIG. 8 is a front view of the manufacturing device partly in section immediately before fully closing a die assembly.

The tip end surfaces 67 of the pistons 62 are positioned (by appropriately dimensioning the associated component parts) so as to simultaneously come into contact with the upper surface 19 of the lower die 18 as the upper die 20 approaches the lower die 18 or, more specifically, when the upper die 20 descends to a point slightly short of a position where the lower surface 22 of the upper die 20 comes into surface contact with the upper end surface 108 of the motor core 101, as shown in FIG. 8.

Figure 4:
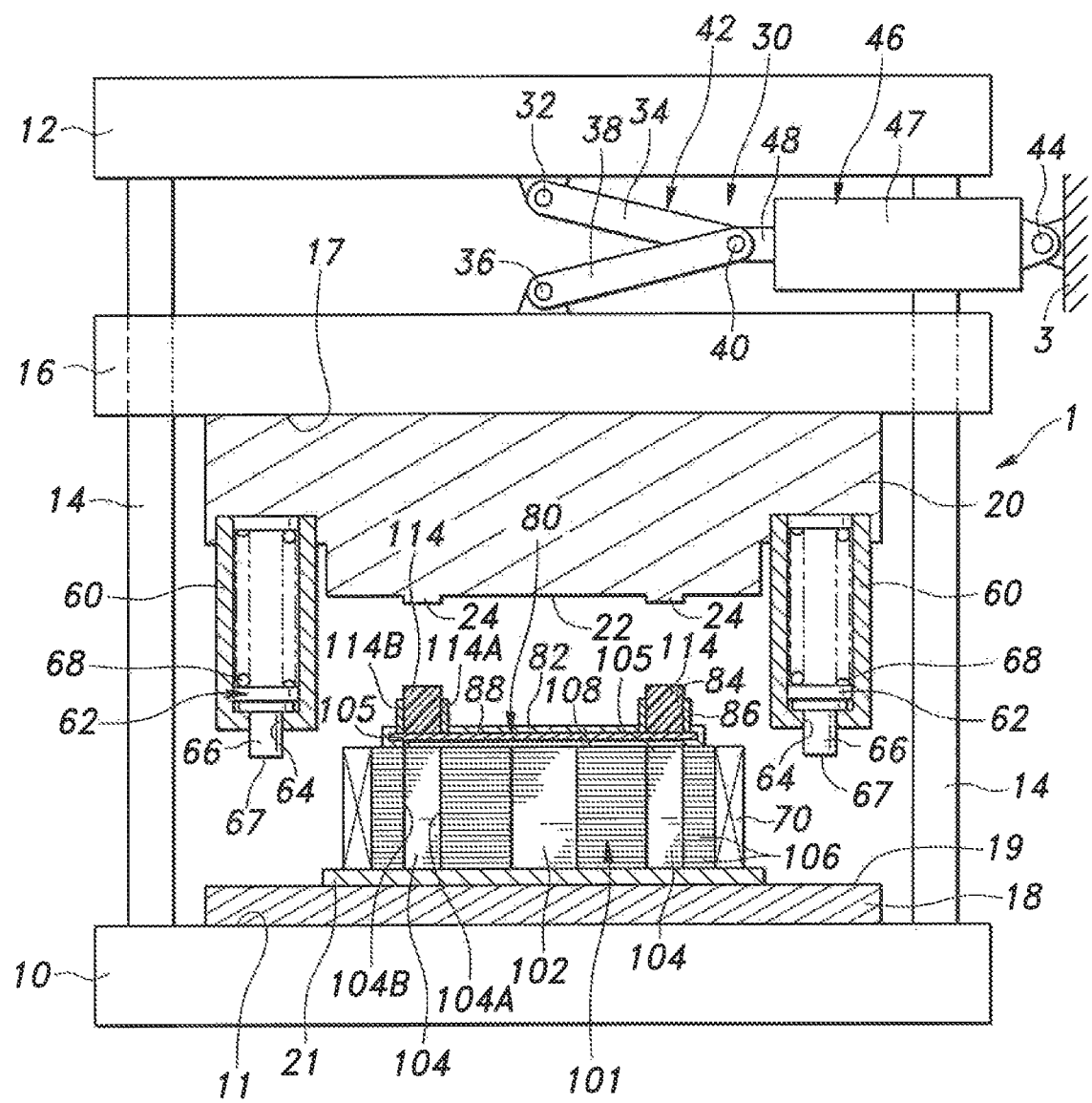
FIG. 4 is a front view of the manufacturing device partly in section in a resin charging step.
Figure 5:
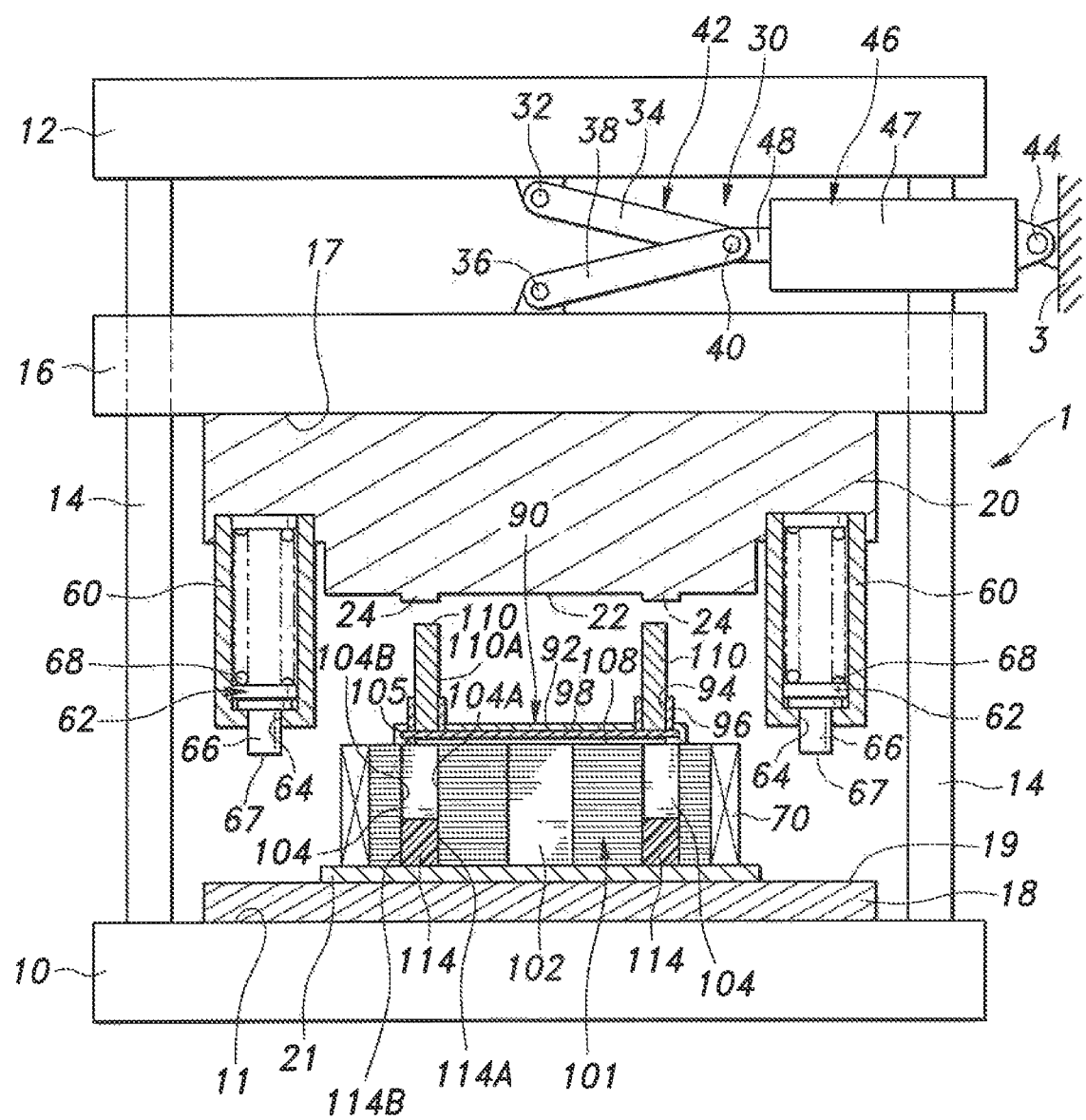
FIG. 5 is a front view of the manufacturing device partly in section in a magnet insertion step.

The manufacturing device of this embodiment includes a resin charging device 80 (see FIG. 4) and a magnet insertion device 90 (see FIG. 5).

As shown in FIG. 4, the resin charging device 80 includes a substrate 82, a plurality of resin holding members 86 provided on the substrate 82 and defining resin holding holes 84, respectively, corresponding to the respective magnet insertion holes 104, and a shutter plate 88 that is rotatably attached to the lower bottom surface of the substrate 82 to selectively shield the lower end openings of the resin holding holes 84. By a conveying device (not shown in the drawings) such as a robot arm or the like, the resin charging device 80 is placed on the upper end surface 108 of the motor core 101 on the lower die 18.

The resin holding holes 84 are each configured to hold the resin 114 in solid form (hereinafter, solid resin 114). The solid resin (resin block) 114 is obtained by molding uncured material resin in powder or granular form into a substantially rectangular parallelepiped shape that matches the shape of the magnet insertion hole 104 by using a tabletting machine or the like (not shown in the drawings) in a preliminary molding process.

As shown in FIG. 5, the magnet insertion device 90 includes a substrate 92, a plurality of magnet holding members 96 provided on the substrate 92 and defining magnet holding holes 94, respectively, corresponding to the respective magnet insertion holes 104, and a shutter plate 98 that is rotatably attached to the lower bottom surface of the substrate 92 to selectively shield the lower end openings of the magnet holding holes 94. By a conveying device (not shown in the drawings) such as a robot arm or the like, the magnet insertion device 90 is placed on the upper end surface 108 of the motor core 101 on the lower die 18.

Next, the process of fixing the magnets 110 inserted in the respective magnet insertion holes 104 with the resin 112 is described in the following with reference to FIGS. 3 to 9.

First of all, as shown in FIG. 3, as a motor core loading step, when the movable platen 16 is at the uppermost position, and the upper die 20 is separated from the lower die 18 to a maximum extent (a die open state), the conveying tray 21 carrying a motor core 101 is placed (loaded) on a prescribed position on the lower die 18 by using a conveying device (not shown in the drawings).

Next, as shown in FIG. 4, as a resin charging step, in the die open state, the resin charging device 80, in which solid resin 114 is placed in each resin holding hole 84, is moved onto the upper end surface 108 of the motor core 101 by using a conveying device (not shown in the drawings). Thereafter, the lower end openings of the resin holding holes 84 are opened by the rotation of the shutter plate 88 with the result that the solid resin 114 in each resin holding hole 84 falls and is thereby charged into the corresponding magnet insertion hole 104.

When the charging of the solid resin 114 into the resin holding holes 84 is completed, the resin charging device 80 is removed from the lower die 18 (carried out to the outside of the device main body 1) by a conveying device (not shown in the drawings).

Next, as a melting step, the solid resin 114 disposed in each magnet insertion hole 104 is heated within each magnet insertion hole 104 by the heat transferred from the motor core 101 which is heated by the heating device 70. As a result, each solid resin 114 starts melting in the magnet insertion hole 104.

As shown in FIG. 5, each piece of the solid resin 114 has at least one outer surface, or outer surfaces 114A and 114B in the illustrated embodiment which are in surface contact with the inner surfaces 104A and 104B of the corresponding magnet insertion hole 104. As a result, the heat transfer from the motor core 101 to each piece of solid resin 114 is efficiently performed as compared with the case where there is a gap between the two so that the heating of the solid resin 114 in each magnet insertion hole 104 can be performed rapidly and in a thermally efficient manner.

Figure 6:
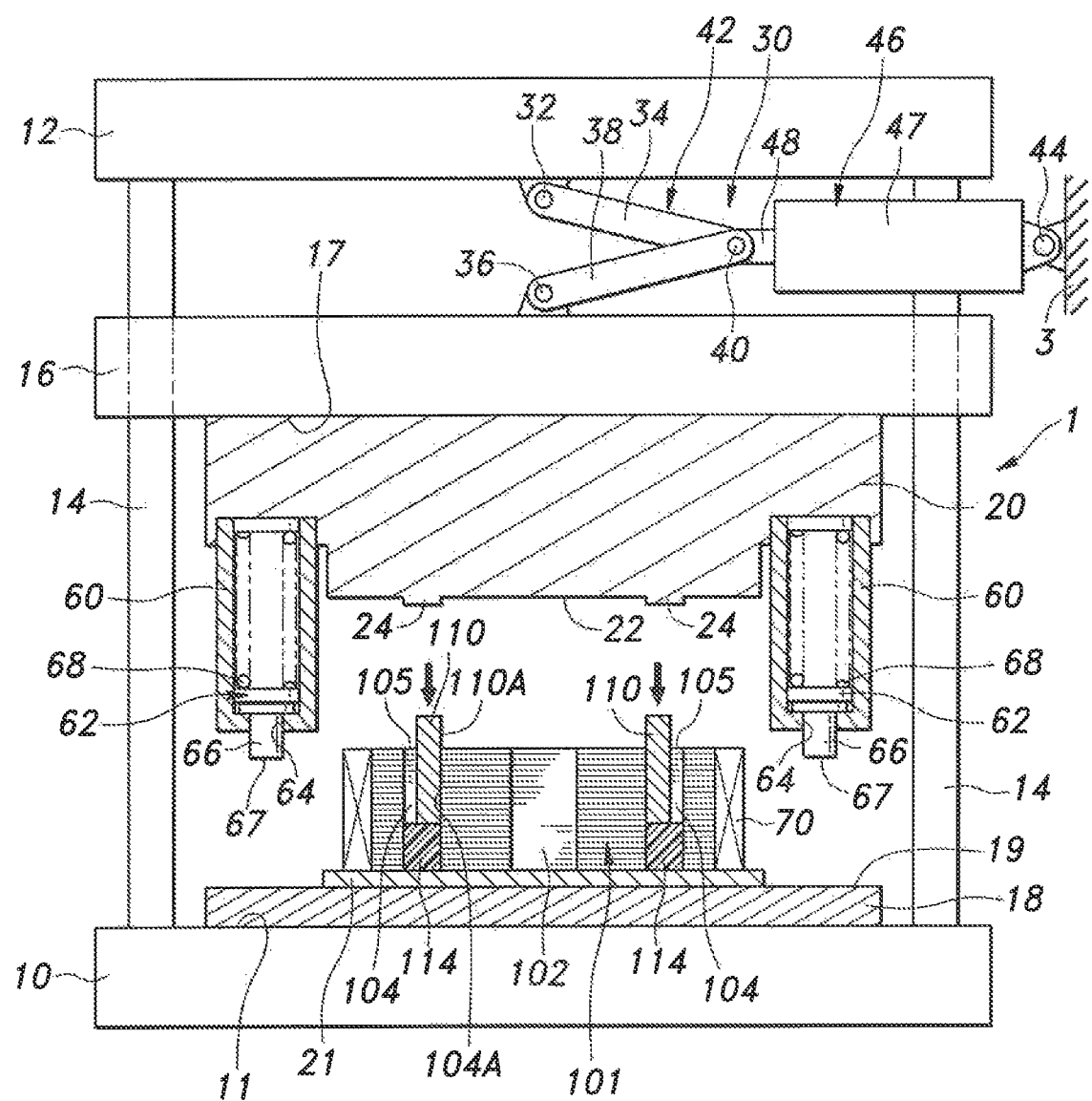
FIG. 6 is a front view of the manufacturing device partly in section when magnets are already inserted.

In a magnet insertion step which is performed prior to or concurrently with the melting step, as shown in FIG. 5, while still in the die open state, the magnet insertion device 90 having the magnets 110 received in the respective magnet holding holes 94 is conveyed onto the upper end surface 108 of the motor core on the lower die 18 by using a conveying device (not shown in the drawings). Thereafter, the lower end openings of the magnet holding holes 94 are opened by the rotation of the shutter plate 98, and the magnets 110 in the respective magnet holding holes 94 fall and are thereby inserted into the corresponding magnet insertion holes 104. As shown in FIG. 6, the insertion of each magnet 110 is performed, with one of the outer surfaces 110A of the magnet 110 being brought into contact with the inner surface 104A of the corresponding magnet insertion hole 104 on the side of the center hole 102, until the lower end surface of the magnet 110 abuts against the upper surface of the solid resin 114 received in the magnet insertion hole 104.

When the insertion of the magnets 110 into the respective magnet holding holes 94 is completed, the magnet insertion device 90 is removed from the lower die 18 (conveyed out to the outside of the device main body 1) by a conveying device (not shown in the drawings).

The magnets 110 to be inserted into the magnet insertion holes 104 may be heated in advance (preheated) to a predetermined temperature by using a heating oven (not shown in the drawings) or the like. In this case, the solid resin 114 in each magnet insertion hole 104 is directly heated by the heat of the corresponding magnet 110 in addition to being heated by the heat from the motor core 101 which is heated by the heating device 70. Thereby, the time required for melting, the solid resin 114 in the melting step is shortened, and the manufacturing efficiency of the magnet embedded core 100 is improved. Melting of the solid resin 114 means that the raw material resin constituting the solid resin 114 is brought to a liquid state or softened to have a certain fluidity.

Next, once the solid resin 114 has melted, each magnet 110 is pushed toward the bottom of the magnet insertion hole 104. At this time, the liquid level of the molten resin 116 (see FIG. 7) gradually rises in the magnet insertion hole 104 as the magnet 110 is pushed down further.

Figure 7:
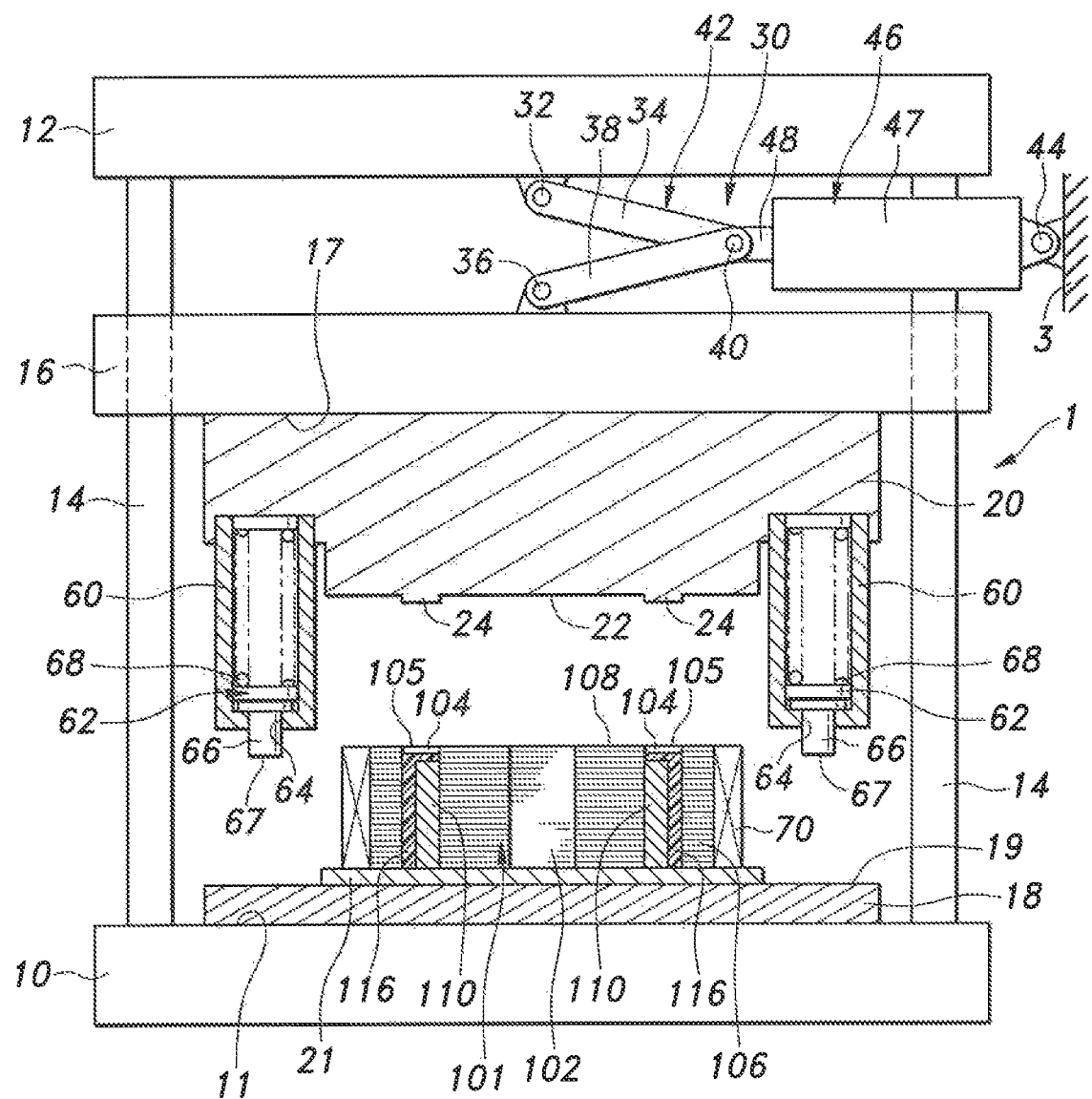
FIG. 7 is a front view of the manufacturing device partly in section in a resin melting step.

As shown in FIG. 7, when the magnet 110 is pushed fully into the prescribed placement position or to the bottom of the magnet insertion hole 104, the molten resin 116 fills the gap between the inner surface of the magnet insertion hole 104 remote from the center hole 102 and the corresponding outer side surface of the magnet 110, and the liquid level of the resin 112 rises above the upper surface of the magnet 110.

Next, the piston rod 48 is caused to move forward by supplying a hydraulic pressure to the hydraulic cylinder device 46. As the piston rod 48 advances, the angle formed by the upper link 34 and the lower link 38 increases, and the toggle link mechanism 42 becomes progressively extended so that the upper die 20 moves downward along with the movable platen 16.

As shown in FIG. 8, when the upper die 20 has descended to a position where the lower surface 22 thereof is slightly short of the upper end surface 108 of the motor core 101, the tip end surfaces 67 of the pistons 62 abut on the upper surface 19 of the lower die 18.

As the toggle link mechanism 42 further extends, and the upper link 34 and the lower link 38 extend in a straight line as shown in FIG. 9 (or, in other words, the toggle link mechanism 42 has fully extended), the lower surface 22 of the upper die 20 comes into surface contact with the upper end surface 108 of the motor core 101 to pressurize the motor core 101 in the stacking direction, and the pressurization projections 24 engage the corresponding magnet insertion holes 104 to close the upper openings 105 and to pressurize the molten resin 116 in the magnet insertion holes 104 as a resin pressurization step (clamped and pressurized state).

By this clamping action, the gaps between adjacent iron core laminates 106 are reduced or eliminated so that leakage of the molten resin 116 into the gaps between the adjacent iron core laminates 106 is decreased or avoided. Also, by pressurizing the molten resin 116 in the magnet insertion holes 104, voids that may be remaining in the molten resin 116 are expelled or contracted in a favorable manner.

While in this clamped state, as a curing step, the motor core 101 is heated to a higher temperature than the temperature in the melting step by the heating device 70. As a result, the molten resin 116 is further heated by the heat from the motor core 101 so that the molten resin 116 chemically reacts, and cures irreversibly. The magnets 110 in the magnet insertion holes 104 are thereby fixed to the motor core 101 by the cured resin 112 (see FIG. 2), and the magnet embedded core 100 is completed. The completed magnet embedded core 100 is conveyed out of the device main body 1 together with the conveying tray 21 by a conveying device (not shown in the drawings).

Since the curing process of the molten resin 116 is performed in the clamped state in which the motor core 101 is pressurized by the upper die 20 and the upper opening 105 is closed, the resin 112 fixes the magnets 110 with a slight or no leakage of the resin 112 into the gaps between the adjacent iron core laminates 106. Thereby, the magnet embedded core 100 having a stable quality with excellent magnetic property can be obtained.

Furthermore, since the curing process is performed while the resin 112 in the magnet insertion holes 104 is pressurized by the pressurization projections 24 as a resin pressurization step, voids that may be remaining in the molten resin 116 are expelled or contracted in a favorable manner before the molten resin 116 is fully cured so that the magnets 110 can be fixed in a reliable manner by the resin 112 having few voids therein.

As the resin 112 used for fixing the magnets 110, the solid resin 114 is charged into the magnet insertion holes 104, and the solid resin 114 is melted in the magnet insertion holes 104. Therefore, as opposed to the injection molding process in which the molten resin is filled into the magnet insertion holes 104 under pressure via runners and gates formed in the die assembly, wastage of the resin remaining in the runners and the gates can be avoided, and the material cost is reduced. Also, by using the solid resin 114, the amount of the solid resin 114 to be charged into the magnet insertion holes 104 can be correctly set without any excess or shortage, and the handling of the material resin can be improved so that the work efficiency of the resin charging step can be improved.

In the course of the upper die 20 descending from the state in which the tip end surfaces 67 of the pistons 62 are in contact with the upper surface 19 of the lower die 18 to the clamped state, the compression coil springs 68 are compressed by the downward movement of the upper die 20, along with the tubular member 60, relative to the pistons 62, and provide a spring three that urges the lower die 18 and the upper die 20 away from each other.

As a result, in the maximum extended state of the toggle link mechanism 42, the pressurizing force acting on the motor core 101 is reduced by the sum of the spring forces provided by the compressive deformation of the compression coil springs 68. Namely, the clamping force provided by the toggle link mechanism 42 is partially canceled, and the pressurizing force acting upon the motor core 101 in the stacking direction is reduced from the rated clamping force provided by the toggle link mechanism 42 in the most extended state.

As a result, even if an inexpensive general-purpose toggle type clamping device 30 capable of obtaining a repeated stable clamping force (resin pressurizing force) of up to several tens of tons is used, an appropriate pressurizing force can be obtained in a stable manner without applying an excessive pressuring force to the motor core 101 when the die assembly is closed so that the motor core 101 is prevented from being excessively deformed in the stacking direction and the molten resin 116 is not excessively pressurized. As a result, even though the molten resin 116 is cured in the clamped state, the planarity of the motor core 101 following the opening of the die assembly is not impaired, and the molten resin 116 is prevented from leaking from the magnet insertion holes 104 to the outside.

In addition, since the motor core 101 is not deformed excessively in the lamination direction at the time of clamping, no excessive stress is produced in the resin 112 which is cured in the magnet insertion holes 104 of the motor core 101 when the die assembly is opened so that peeling and cracking of the resin 112 in the magnet insertion holes 104 can be avoided.

Thus, the leakage of the molten resin 116 to the outside of the magnet insertion holes 104 can be avoided, and the shape precision and the dimensional precision of the motor core 101 can be ensured at the same time. Therefore, the magnet embedded core 100 having a stable quality can be efficiently manufactured.

The pressurizing force that actually acts on the motor core 101 at the time of clamping the die assembly or when the toggle link mechanism 42 is maximally extended depends on the rated clamping force of the clamping device 30 and the spring properties such as the spring constant, the compressive deformation and the preload of the compression coil springs 68. Therefore, the actual pressurizing force acting upon the motor core 101 when the die assembly is closed can be freely adjusted by changing the spring properties. Therefore, even though the rated clamping force of the clamping device 30 is a fixed value, the pressurizing force actually applied to the motor core 101 when the die assembly is closed can be freely selected.

The proper pressurizing force when filling the magnet embedded core 100 with the resin varies depending on specifications such as the size of the motor core 101 and the number of the iron core laminates. In the present embodiment, filling of the resin for a wide range of magnet embedded cores 100 with varying specifications can be performed with an optimum pressurizing force for each of the wide range of magnet embedded cores 100 simply by changing the spring properties of the compression coil springs 68 even though the same device main body 1, lower die 18 and upper die 20 are used. Therefore, the investment for the manufacturing device for filling resin for a wide range of magnet embedded cores 100 can be reduced. In other words, with a minimum investment in the manufacturing device, the manufacturing device can be easily adapted to the process of filling resin for a wide range of magnet embedded cores 100.

Since the compression coil springs 68 are arranged around the center of the center hole 102 of the motor core 101 positioned on the lower die 18 via the conveying tray 21, the partial canceling of the clamping force of the toggle link mechanism 42 by the spring force of the compression coil springs 68 is prevented from becoming uneven around the center of the motor core 101.

As a result, the pressurizing force acting on the motor core 101 in the stacking direction in the fully clamped state is prevented from becoming uneven around the center of the motor core 101 owing to the compression coil springs 68 so that undesired distortion of the motor core 101 can be avoided.

Furthermore, the compressive deformation of each compression cod spring 68 is guided by the corresponding tubular member 60 without undergoing a bending deformation. In addition, because the piston 62 engages the lower die 18 during the movement of the upper die 20 toward the lower die 18, the compression cod spring 68 may be provided with a relatively short length without regard to the opening stroke of the die assembly.

The lower die 18 is fixed to the lower fixed platen 10 while the upper die 20 is fixed to the movable platen 16, and the compression cod springs 68 are arranged in parallel to one another between the lower die 18 and the upper die 20 so that the spring force of the compression coil springs 68 acts directly upon the lower die 18 and the upper die 20. In particular, the lower die 18 and the upper die 20 are not supported by or suspended from the lower fixed platen 10 or the movable platen 16 via the compression coil springs 68 in a floating manner. Therefore, the lower die 18 and the upper die 20 are prevented from tilting or otherwise becoming unstable. Owing to such arrangements, a proper clamping action can be ensured at all times.

Figure 10:
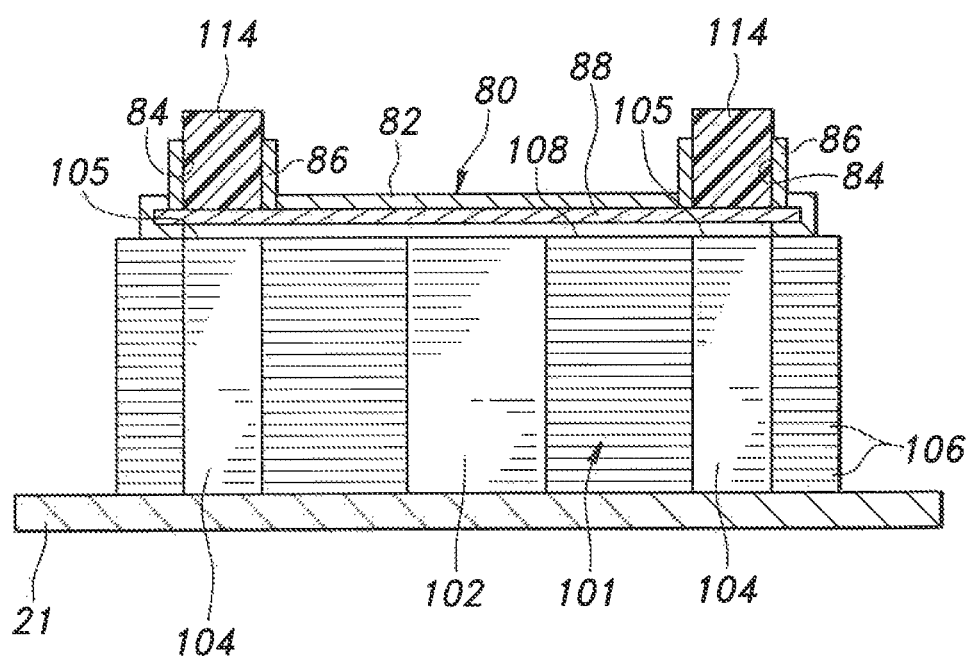
FIG. 10 is a front view of a manufacturing device for the magnet embedded core according to another embodiment of the present invention, partly in section.

Next, a manufacturing device for a magnet embedded core according to another embodiment of the present invention is described in the following with reference to FIG. 10. In FIG. 10, parts corresponding to those in FIG. 4 are denoted with like reference numerals, and description of such parts may be omitted.

In this embodiment, the resin charging device 80 is placed on the motor core 101 mounted on the conveying tray 21 at a location outside of the device main body 1 including the lower die 18 and the upper die 20, and charges the solid resin 114 into the magnet insertion holes 104 of the motor core 101.

In this embodiment, the time period during which the device main body 1 is occupied by the resin charging step is eliminated so that the operation efficiency of the device main body 1 is improved. Also, the time period required for manufacturing each magnet embedded core 100 is reduced, and the efficiency of manufacturing the magnet embedded core 100 can be improved.

Figure 11:
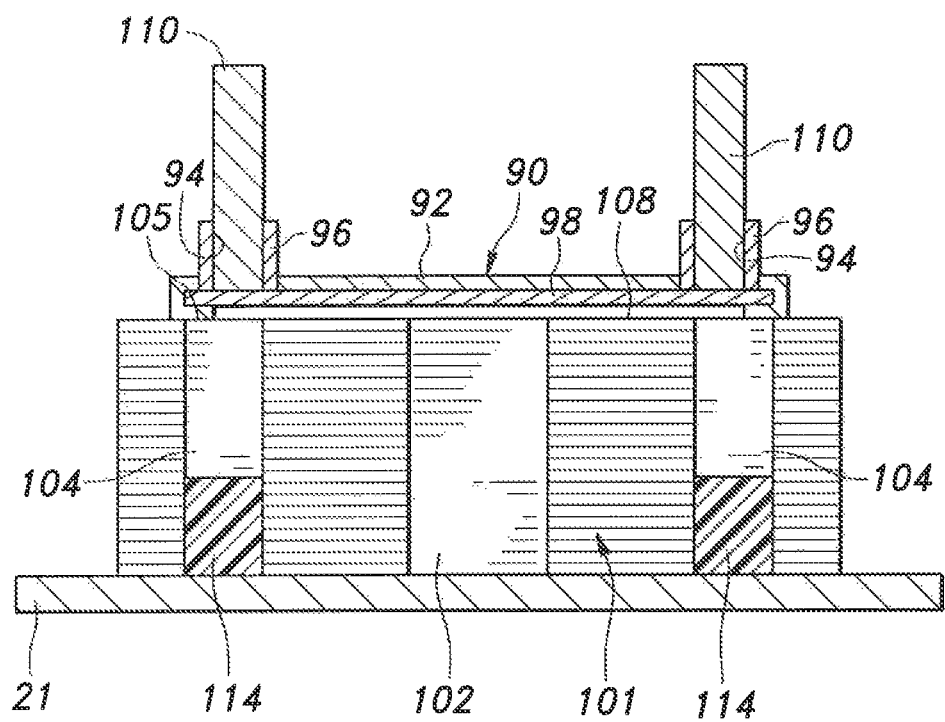
FIG. 11 is a vertical sectional view of a manufacturing device for the magnet embedded core according to yet another embodiment of the present invention.

Next, a manufacturing device for a magnet embedded core according to yet another embodiment of the present invention is described in the following with reference to FIG. 11. In FIG. 11, parts corresponding to those in FIG. 5 are denoted with like reference numerals, and description of such parts may be omitted.

In this embodiment, the magnet insertion device 90 is placed on the motor core 101 mounted on the conveying tray 21 at a location outside of the device main body 1 including the lower die 18 and the upper die 20, and inserts the magnets 110 into the respective magnet insertion holes 104 of the motor core 101.

In this embodiment, the time period during which the device main body 1 is occupied by the magnet insertion step is eliminated so that the operation efficiency of the device main body 1 is improved. Also, the time period required for manufacturing each magnet embedded core 100 is reduced, and the efficiency of manufacturing the magnet embedded core 100 can be improved.

Figure 12:
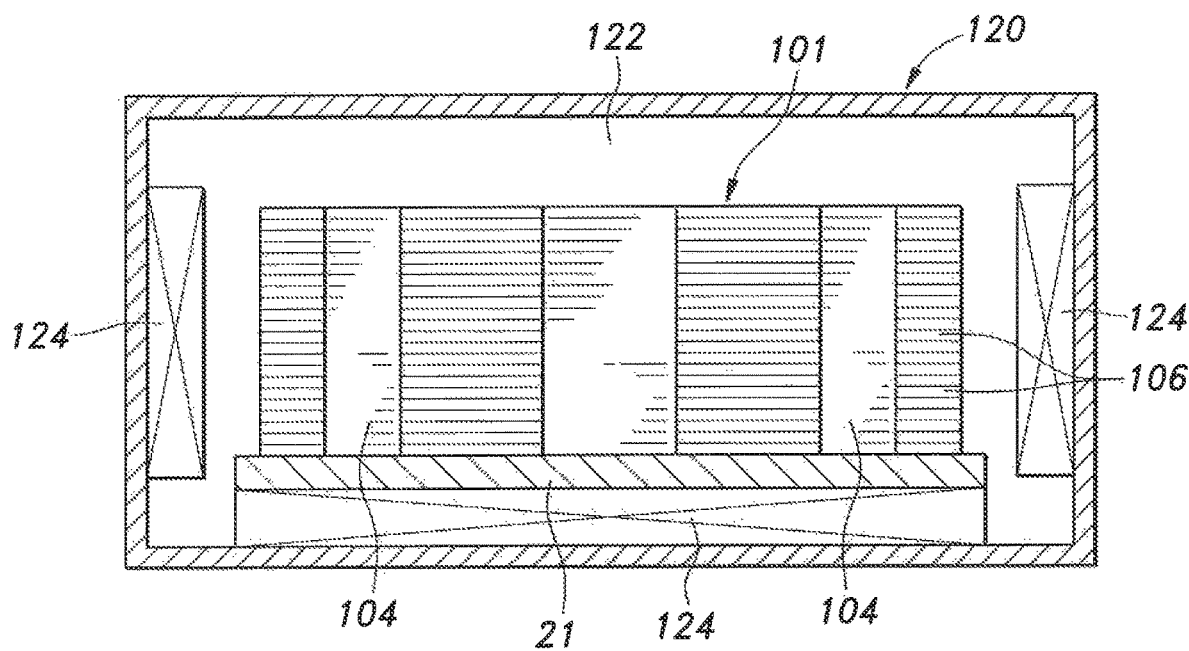
FIG. 12 is a vertical sectional view of a manufacturing device for the magnet embedded core according to yet another embodiment of the present invention.

Next, a device for manufacturing a magnet embedded core according to yet another embodiment is described in the following with reference to FIG. 12.

In this embodiment, a heating oven 120 for heating the motor core 101 is provided separately from the device main body 1 including the lower die 18 and the upper die 20. The heating oven 120 has a heater 124 for raising the temperature of the oven interior 122.

In this embodiment, the motor core 101 is heated in the heating oven 120 located outside of the device main body 1. As a result, the motor core 101 is preheated and the time period required to heat the motor core 101 to the temperature necessary for melting the solid resin 114 on the lower die 18 of the device main body 1 is reduced.

As a result, the time period during which the device main body 1 is occupied by the resin melting step is reduced so that the operation efficiency of the device main body 1 is improved. Also, the time period required for manufacturing each magnet embedded core 100 is reduced, and the efficiency of manufacturing the magnet embedded core 100 can be improved.

Figure 13:
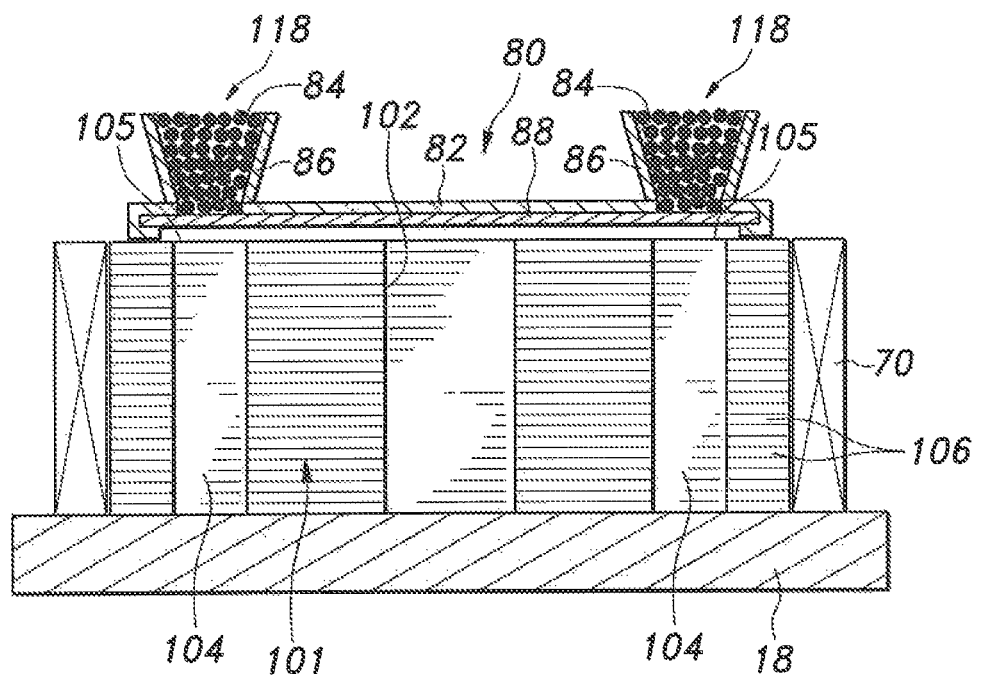
FIG. 13 is a vertical sectional view of a manufacturing device for the magnet embedded core according to yet another embodiment of the present invention.

Next, a device for manufacturing a magnet embedded core according to yet another embodiment is described in the following with reference to FIG. 13.

In this embodiment, uncured granular raw material resin 118 is used as the solid resin.

The resin holding member 86 of the resin charging device 80 of this embodiment has a funnel shape so that the granular raw material resin 118 can be easily poured therein, and each resin holding member 86 may also serve as a measuring cup for the granular raw material resin 118.

Although the present invention has been described in terms of preferred embodiments thereof, as can be appreciated easily by a person skilled in the art, the present invention is not limited by these embodiments, but can be modified as appropriate without departing from the spirit of the present invention.

For instance, the magnet insertion step may be performed before the resin charging step. In this case, since the solid resin is charged into the magnet insertion holes 104 which already contain the magnets 110, from the viewpoint of ease of feeding the resin into the magnet insertion holes 104, the resin preferably consists of uncured granular raw material resin 118. The shapes of the magnet insertion holes 104 and the magnets 110 are not limited to a substantially rectangular parallelepiped shape, but may be any other appropriate shape depending on the required magnetic characteristics and other factors.

The resin 112 is not limited to a thermosetting resin, but may consist of a thermoplastic resin. When a thermoplastic resin is used as the resin 112, a curing step by cooling is performed, instead of the thermal curing step for the thermosetting resin.

The magnet insertion holes 104 are not necessarily required to be through holes each having two open ends, but may also be bottomed holes each opening out at only one end surface of the motor core 101. The filling of the resin into the magnet insertion holes 104 may be performed by using solid resin in sheet form or the like, instead of the solid resin 114 in block form or the granular raw material resin 118. When solid resin is used, since the load in the die opening direction due to the injection pressure of the resin does not act on the die assembly during the resin charging step, the clamping force may be small. Pressurization of the motor core 101 at the time of the die clamping step is not necessarily required, and may only be required to the extent necessary for removing voids from the molten resin 116 in the magnet insertion holes 104. Further, the pressurization of the molten resin 116 in the magnet insertion holes 104 may be performed by a separate pressurization device or a pressurizing member, instead of relying on the pressurization projections 24 of the upper die 20.

The toggle link mechanism 42 may be driven by an electric drive unit using a ball screw and a servomotor, instead of the hydraulic cylinder device 46. In such a case, detection of the maximally extended state of the toggle link mechanism 42 may be detected by any per se known device such as a rotary encoder for detecting the rotational angle of the servomotor. Further, the die clamping device 30 may be driven by a plurality of toggle link mechanisms arranged in parallel to one another.

The clamping device 30 is not limited to the one using a toggle link mechanism, but may also consist of those directly actuated by hydraulic pressure or an electric motor.

The constituent elements of the foregoing embodiments are not entirely essential for the present invention, but may be suitably omitted or substituted without departing from the scope of the present invention.

| GLOSSARY OF TERMS | | | |
|---|---|---|---|
| 1 | device main body | 3 | fixed frame |
| 10 | lower fixed platen | 11 | upper surface |
| 12 | upper fixed platen | 14 | tie bar |
| 16 | movable platen | 17 | lower surface |
| 18 | lower die | 19 | upper surface |
| 20 | upper die | 21 | conveying tray |
| 22 | lower surface | 24 | pressurization projection |
| 30 | clamping device | 32 | pivot shaft |
| 34 | upper link | 36 | pivot shaft |
| 38 | lower link | 40 | pivot shaft |
| 42 | toggle link mechanism | 44 | pivot shaft |
| 46 | hydraulic cylinder device | 47 | cylinder tube |
| 48 | piston rod | 60 | tubular member |
| 62 | piston | 64 | through hole |
| 66 | tip end portion | 67 | tip end surface |
| 68 | compression coil spring | 70 | heating device |
| 80 | resin Charging device | 82 | substrate |
| 84 | resin holding hole | 86 | resin holding member |
| 88 | shutter plate | 90 | magnet insertion device |
| 92 | substrate | 94 | magnet holding hole |
| 96 | magnet holding member | 98 | shutter plate |
| 100 | magnet embedded core | 101 | motor core |
| 102 | center hole | 104 | magnet insertion hole |
| 104A | inner surface | 105 | upper opening |
| 106 | iron core laminate | 108 | upper end surface |
| 110 | magnet | 110A | outer surface |
| 112 | resin | 114 | solid resin |
| 114A | outwardly facing surface | 116 | molten resin |
| 118 | material resin | 120 | heating oven |
| 122 | oven interior | 124 | heater |

The invention claimed is:

1. A method for manufacturing a magnet embedded core including a magnet embedded in resin filling a magnet insertion hole extending axially in a motor core, the method comprising:
   a resin charging step of charging the resin in solid form and separate from the magnet into the magnet insertion hole;
   a magnet insertion step of inserting the magnet after the resin charging step;
   a melting step of melting the solid resin in the magnet insertion hole; and
   a curing step of curing the molten resin.

2. The method for manufacturing a magnet embedded core according to claim 1, further comprising a resin pressurization step of pressurizing the molten resin.

3. The method for manufacturing a magnet embedded core according to claim 1, wherein the melting step comprises at least partly melting the solid resin by the motor core which is preheated prior to the resin charging step.

4. The method for manufacturing a magnet embedded core according to claim 1, wherein the solid resin is formed by molding uncured raw material resin in powder or granular form into a prescribed shape.

5. The method for manufacturing a magnet embedded core according to claim 4, wherein at least one of outer surfaces of the solid resin is in contact with an inner surface of the motor core defining the magnet insertion hole.

6. The method for manufacturing a magnet embedded core according to claim 1, wherein the solid resin is in uncured, granular form.

7. The method for manufacturing a magnet embedded core according to claim 4, wherein the solid resin is formed by molding uncured raw material resin in powder or granular form into a shape that matches the shape of the magnet insertion hole.

8. The method for manufacturing a magnet embedded core according to claim 1, wherein the resin consists of a thermosetting resin.

\* \* \* \* \*